United States Patent [19]

Kuwana et al.

[11] Patent Number: 5,210,693
[45] Date of Patent: May 11, 1993

[54] ANTI-SKID CONTROL SYSTEM

[75] Inventors: Kazutaka Kuwana; Kuniaki Okamoto; Tsuyoshi Yoshida; Hiroyuki Ichikawa; Masaru Kamikado; Nobuyasu Nakanishi, all of Aichi; Tatsuo Sugitani, Shizuoka; Kazunori Sakai, Aichi, all of Japan

[73] Assignee: Aisin Seiki Kabushiki Kaisha, Kariya, Japan

[21] Appl. No.: 562,992

[22] Filed: Aug. 6, 1990

[30] Foreign Application Priority Data

Aug. 4, 1989 [JP] Japan .................. 1-203492

[51] Int. Cl.$^5$ .............................................. B60T 8/60
[52] U.S. Cl. .............................. 364/426.02; 180/197; 303/95; 303/100
[58] Field of Search ............... 364/426.02, 426.03; 180/197; 303/95, 100, 104, 110

[56] References Cited

U.S. PATENT DOCUMENTS

| | | | |
|---|---|---|---|
| 4,788,644 | 11/1988 | Inagaki | 364/426.03 |
| 4,939,656 | 7/1990 | Hoashi et al. | 364/426.02 |
| 4,947,954 | 8/1990 | Fujita et al. | 180/197 |
| 4,955,448 | 9/1990 | Ise et al. | 364/426.02 |
| 4,976,329 | 12/1990 | Ise | 180/197 |
| 5,046,787 | 9/1991 | Kuwana et al. | 364/426.02 |

Primary Examiner—Vincent N. Trans
Attorney, Agent, or Firm—Sughrue, Mion, Zinn, Macpeak & Seas

[57] ABSTRACT

The anti-skid control system is provided with wheel velocity sensors only for the driving wheels and yet is capable of performing the anti-skid control through its accurate estimation of the vehicle speed and proper compensatory control even when sharp braking occurs immediately upon the release of the accelerator after the occurrence of acceleration slip. The anti-skid control system is capable of starting the anti-skid control with certainty even when the braking operation is not detected because of a failure in the operation of the brake switch. The system is provided with a fluid pressure generating device, a fluid pressure controlling device, a brake operation detecting device, an acceleration detecting device, a wheel velocity detecting device, a braking force controlling device, a brake force correcting device and an acceleration slip detecting device.

3 Claims, 9 Drawing Sheets

ANTI-SKID CONTROL SYSTEM

FIELD OF THE INVENTION

The present invention relates to an anti-skid control system which prevents the wheels from locking through control performed over the braking force exerted on the wheels at the time when the brake is applied to the motor vehicle.

BACKGROUND OF THE INVENTION

It has been widely known that the directional stability of a motor vehicle is lost in some cases, depending on the conditions of the road surface, if the wheels of the motor vehicle are locked when the brake is applied sharply. Therefore, it is in practice to control the braking force in such a manner as to eventually keep the slip factor of the wheels at approximately 20%, that is, so as to obtain the maximum coefficient of friction, by controlling the brake fluid pressure in accordance with the changes in the wheel velocity and the wheel acceleration, in consideration of the fact that the wheel velocity declines abruptly immediately before the coefficient of friction $\mu$ attains the maximum value in relation to the wheels when the pressure of the brake fluid working on the wheel cylinder is increased at the time of braking.

Specifically, motor vehicles are provided with an anti-skid control system which controls the braking force by reducing, increasing, or maintaining the pressure of the brake fluid working on the wheel cylinders in such a manner that the wheels will not be locked at the time of sharp braking.

Such an anti-skid control system is applied either to the control of the front and rear wheels or to the control of the rear wheels, and; in either of these applications, the system needs wheel velocity sensors which detect the rotating speed of at lease the wheels to which the driving force is transmitted, that is, the driving wheels. For the control of the front and rear wheels, such rotating speed sensors are installed for all the individual wheels including the driven wheels, and, for the control of the rear wheels, such a construction would be feasible. Yet, in consideration of various advantages, such as the simplicity of construction, wheel velocity sensors are arranged only on the side of the rear wheels, which are driving wheels.

In this regard, it is noted that a wheel spin occurs at the time of a start or an acceleration on a road surface with a low coefficient of friction, such as a snow-covered road, if excessive driving force is transmitted to the wheels. That is to say, slips will occur not only at the time of braking applied to a motor vehicle, but also at the time of its acceleration, in what is generally called "acceleration slip". In such a case, a system with wheel velocity sensors provided only on the side of the driving wheels will give a detected wheel velocity higher than the actual vehicle speed.

In this regard, the Official Gazette for Patent Laid Open No. 184160-1986, for example, points out the problem, with respect to the existing anti-skid control systems, by a statement to the effect that, in case a wheel spin or the like has occurred while a motor vehicle is running at a generally constant speed on an uneven road, such anti-skid control systems start anti-skid control when the deceleration of the wheels reaches the preset deceleration at the time when the wheel velocity of the driving wheels resumes the original wheel velocity after it increases sharply, so that the brake attains poorer braking efficiency. In an attempt to deal with this problem, the invention laid open in the Official Gazette for Patent cited above proposes the provision of an initial state maintaining means, which maintains the anti-skid control system in its initial phase state while the brake is not working. Specifically, the invention offers a system which resets the anti-skid control circuit while the brake switch remains turned OFF.

However, even with the anti-skid control system disclosed in the Official Gazettes for Patent cited above, it is probable that there emerges a situation in which the wheel velocity is higher than the actual vehicle speed and also the estimated vehicle speed which is set on the basis of the wheel velocity is higher than the actual vehicle speed if a braking operation is performed immediately after the accelerating operation is cancelled when an acceleration slip has occurred. Therefore, the cited system will start its anti-skid control, with a reduction of the brake fluid pressure, at least at the time of a braking operation after an acceleration slip.

FIG. 11 shows one example of the state of control at work in a conventional anti-skid control system. In this Figure, (a) shows the state of the accelerating operation, (b) shows the state of the on/off operations of the brake switch, (c) shows the changes in the wheel velocity Vw, the actual vehicle speed V, and the estimated vehicle speed $V_{S0}$, and (f) shows the changes in the pressure of the brake fluid in the wheel cylinders for the rear wheels. Moreover, the broken line in (d) indicates the fluid pressure output from the master cylinder. The Figure shows a state in which the accelerating operation is cancelled at the point x in the course of an acceleration slip and a braking operation is then performed at the point y, the brake switch being thereupon turned ON. By this series of operations, the wheel velocity Vw decreases sharply as from the point x and an increase of the brake fluid pressure is begun at the point y, but, as the wheel velocity will be lower than the standard speed which is set at the point z on the basis of the estimated vehicle speed $V_{S0}$, the system will start its anti-skid control, performing the operation for a reduction of the brake fluid pressure. That is to say, the estimated vehicle speed $V_{S0}$ is set at a value in excess of the actual vehicle speed V. With this setup, it will take a longer time for the wheel velocity Vw to restore itself to the estimated vehicle speed $V_{S0}$, so that the braking distance is extended.

SUMMARY OF THE INVENTION

Therefore, the object of the present invention is to offer an anti-skid control system provided with wheel velocity sensors only at the side of the driving wheels, wherein the said system is capable of detecting the state of an acceleration slip in case the accelerating operation is cancelled after an acceleration operation has occurred.

Another object of the present invention is to offer an anti-skid control system which performs control over the braking force in such a manner that the state of insufficient braking force will not continue for any duration of time in excess of the prescribed period even in case the system performs its anti-skid control when a braking operation is performed immediately after the accelerating operation is cancelled upon the occurrence of an acceleration slip.

In order to accomplish the objects described above, the anti-skid control system according to the present invention, as illustrated in the outline of its construction given in FIG. 1, is provided with wheel cylinders 51 through 54, which are installed on each and all of the individual wheels FR, Fl, RR, and RL, including the wheels RR and RL, namely, the driving wheels for the motor vehicle, and furnish braking force to the said wheels, a fluid pressure generating device M1, which feeds brake fluid pressure to each of the said wheel cylinders 51 through 54 in accordance with the braking operations of the brake operating member MO, a fluid pressure controlling device M2, which is set in the fluid pressure channel connected for fluid inter-transmission with the fluid pressure generating device M1 and between the wheel cylinders 53 and 54 installed on the driving wheels RR and RL, respectively, an acceleration detecting means M3, which detects the acceleration of the motor vehicle, a wheel velocity detecting means M4, which detects the wheel velocity of the wheels RR and RL, and a braking force controlling means M5, which drives the fluid pressure controlling device M2 in accordance with the output signals from this wheel velocity detecting means M4 and the acceleration detecting means M3 and controls the brake fluid pressure in the brake fluid fed to the wheel cylinders 53 and 54. This anti-skid control system is provided also with a brake operation detecting means M6, which detects the brake operation with the brake operating member M0, an acceleration slip detecting means M7, which outputs an acceleration slip signal when it detects that a state in which the ratio of a decline in the wheel velocity mentioned above exceeds the prescribed value has continued for the first prescribed duration of time $Ts_1$ in the state in which this brake operation detecting means M6 has not detected any brake operation, and a braking force correcting means M8, which controls the braking force controlling means M5 in such a manner as to increase the braking force exerted onto the wheels RR and RL, which are the driving wheels, when it has detected that a state in which the acceleration slip detecting means M7 is generating an acceleration slip signal has continued for the second prescribed duration of time $Ts_2$ in the state in which the brake operation detecting means M6 has detected any brake operation.

Moreover, as a specific means of judging the state in which the ratio of a decline in the wheel velocity exceeds the prescribed value, the system has a means of calculating the wheel acceleration from the wheel velocity detected by the wheel velocity detecting means M4 and comparing this wheel acceleration value with the prescribed gravitational speed, Gs.

Furthermore, a specific means of increasing the braking force applied to the wheels RR and RL, which are the driving wheels can be realized by setting a value at an acceleration larger than the acceleration at the time of braking on a road surface with a high coefficient of friction as judged by the acceleration detecting means M3, namely, at a deceleration larger than the deceleration at the time of braking on the same road surface, with respect to the control with the braking force controlling means M5 for driving the fluid pressure controlling device M2 in accordance with the output signals from the wheel velocity detecting means M4 and the acceleration detecting means M3.

The anti-skid control system formed in the construction described above works in such a manner that, when the fluid pressure generating device M1 is driven in response to the braking operation of the brake operating member M0, brake fluid pressure is supplied to each of the wheel cylinders 51 through 54 by way of the fluid pressure controlling device M2, and braking force is thereby applied to the individual wheels FR, FL, RR, and RL. In the meanwhile, the acceleration detecting means M3 detects the acceleration of the motor vehicle. Moreover, the rotating speed, namely, the wheel velocity, of the wheels RR and RL, which are the driving wheels, are detected by the wheel velocity detecting means M4. The operation of the fluid pressure controlling device M2 mentioned above is controlled by the braking force controlling means M5 in accordance with the output signals from the acceleration detecting means M3 and the wheel velocity detecting means M4 mentioned above.

In the meantime, the brake operation by the brake operating member M0 is detected by the brake operation detecting means M6. Then, the acceleration slip is detected by the acceleration slip detecting means M7 in accordance with the output from this brake operation detecting means M6 and the wheel velocity detecting means M4. That is to say, an acceleration slip signal is output from this acceleration slip detecting means M7 when it detects that a state in which the decline ratio of the wheel velocity exceeds the prescribed value has continued for the first prescribed duration of time $Ts_1$ in the state in which the brake operation detecting means M6 does not detect any brake operation.

Furthermore, the braking force correcting means M8 controls the braking force controlling means M5 in such a way as to increase the braking force applied to the wheels RR and RL, which are the driving wheels, when it is detected by the acceleration slip detecting means M7 that the state of output mentioned above has continued for the second prescribed duration of time $ts_2$ in the state in which the brake operation detecting means M6 detects a brake operation while the state of output of the acceleration slip signal continues.

BRIEF DESCRIPTION OF THE DRAWINGS

The manner by which the above objects, features and advantages of the present invention are attained will be fully evident from the following detailed description when it is considered in light of the attached drawings, wherein.

In the Figures mentioned hereinabove, the following reference numbers represent the following items:

2 . . . Fluid pressure generating device
2a . . . Master cylinder
2b . . . Booster
3 . . . Brake pedal (brake operating member)
10 . . . Electronic control device
11 . . . Microprocessor
20 . . . wheel velocity sensor (wheel velocity detecting means)
21 . . . Acceleration sensor (Acceleration detecting means)
22 . . . Brake switch (brake operation detecting means)
30 . . . Actuator (Fluid pressure controlling device)
31 and 32 . . . Solenoids
40 . . . Pump
41 . . . Reserver
51 through 54 . . . Wheel cylinders
FR, FL, RR, and RL . . . Wheels

DETAILED DESCRIPTION OF THE INVENTION

Reference will now be made in detail to the construction of the anti-skid control system according to the present invention as illustrated in the accompanying drawings, in which like reference numbers designate like or corresponding parts throughout the several drawings.

In the description to follow, some preferred embodiments of the present invention will be used as examples. It should be understood, however, that the present invention is not limited to these examples of its embodiment, but may be applied effectively to other forms of its embodiment to such an extent as will not deviate from the technical scope defined for the present invention.

Figure 1:
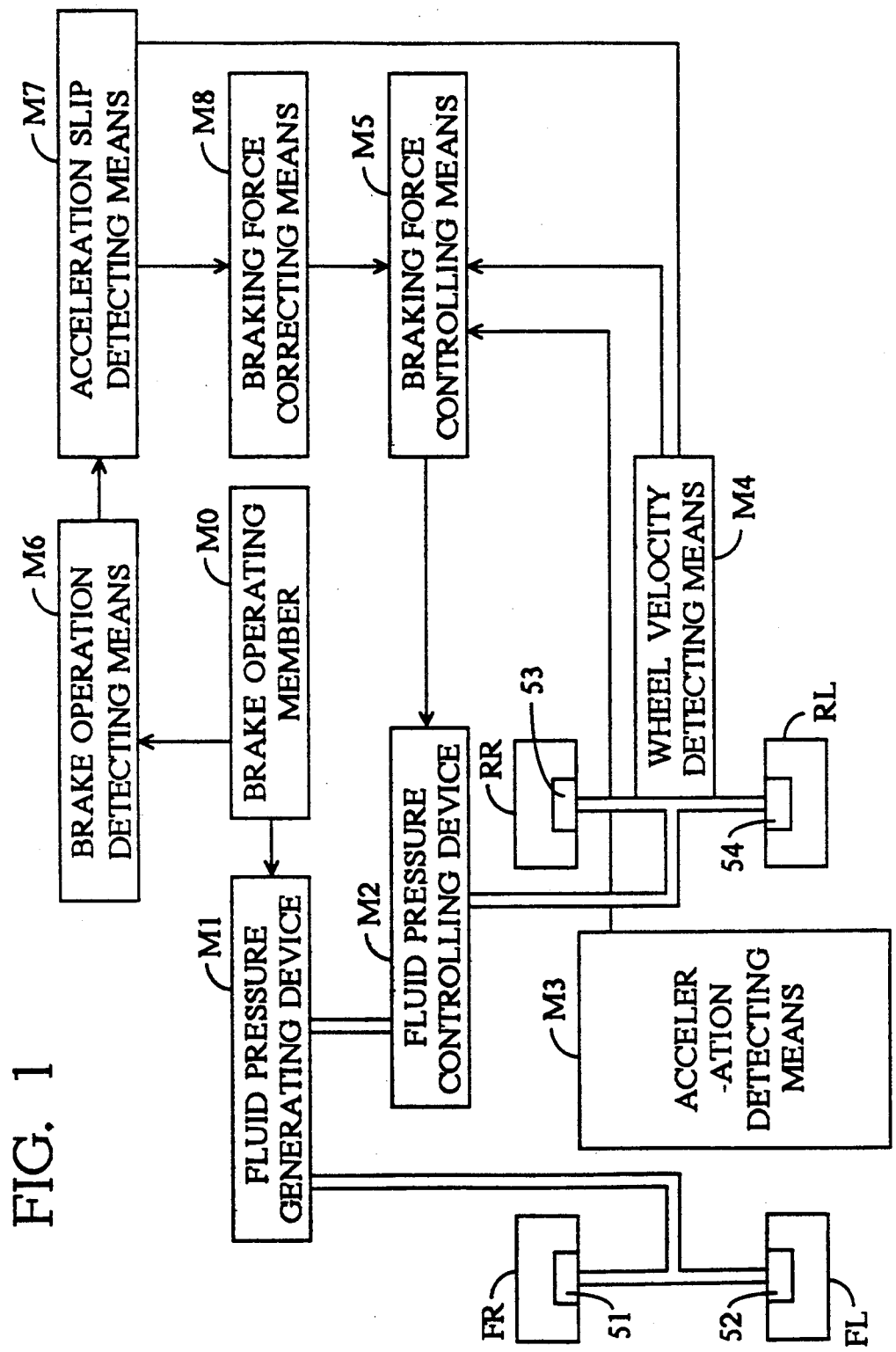
FIG. 1 is a block diagram illustrating the outline of the anti-skid control system according to the present invention.
Figure 2:
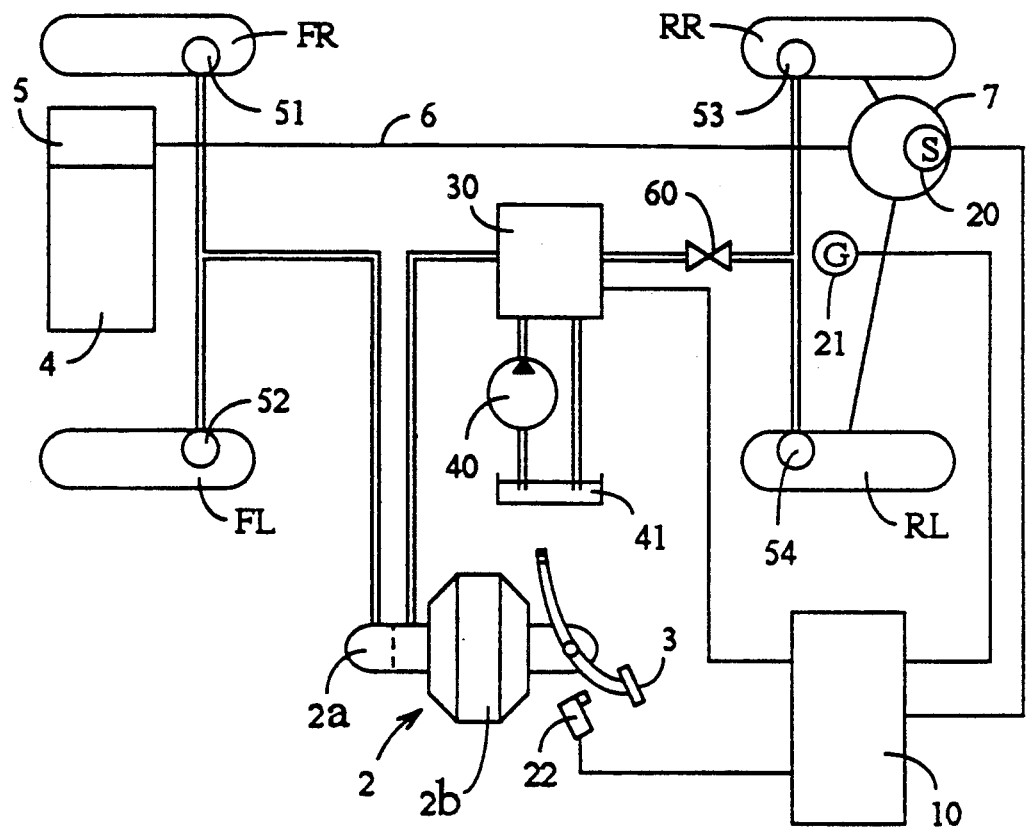
FIG. 2 is a chart illustrating the overall configuration of one preferred embodiment of the anti-skid control system according to the present invention.

Now, FIG. 2 illustrates a motor vehicle equipped with the anti-skid control system in one embodiment of the present invention, and this system has a fluid pressure generating device 2, which is comprised of a master cylinder 2a and a booster 2b and is driven with a brake pedal 3, namely, a brake operating member.

The master cylinder 2a, which is what is generally known as the tandem type master cylinder, is connected directly to the wheel cylinders 51 and 52 for the wheels FR and FL and connected also to the wheel cylinders 53 and 54 for the wheels RR and RL by way of the actuator (fluid pressure controlling device) 30 and the proportioning valve 60. Here, the term, "wheel FR", indicates the wheel positioned on the front right side of the vehicle as viewed from the driver's seat. Likewise, the term, "the wheel FL" represents the wheel on the front left side of the vehicle, the term, "the wheel RR", represents the wheel on the rear right side of the vehicle, and the term, "the wheel RL", represents the wheel on the rear left side of the vehicle. The piping system employed for this system is a piping system divided into two independent systems respectively serving the front wheels and the rear wheels.

The internal combustion engine 4 mounted on the vehicle used in this example of preferred embodiment has a generally known transmission 5 connected to it. The transmission 5 is connected to a differential gear 7 via a propeller shaft 6. To this differential gear 7 are connected the wheels RR and RL, to which the driving force of the internal combustion engine 4 is transmitted. Accordingly, the wheels RR and RL, namely, the rear wheels, constitute the driving wheels in this example of preferred embodiment.

Therefore, when operating force, i.e. stepping force, is applied onto the brake pedal 3, the booster 2b is driven in accordance with the stepping force, and the master cylinder 2a is driven under boosted pressure exerted by the booster 2b. By this, the brake fluid pressure in accordance with the stepping force applied onto the brake pedal 3 is output from the master cylinder 2a and supplied to the wheel cylinders 51 through 54. When the brake fluid pressure is thus applied to the wheel cylinders 51 and 52, braking force is exerted to the wheels FR and FL, i.e. the front wheels, which are the driven wheels, and, when the brake fluid pressure is applied to the wheel cylinders 53 and 54, the braking force is exerted to the wheels RR and RL, i.e. the rear wheels, which are the driving wheels.

The actuator (fluid pressure controlling device) 30, which forms the fluid pressure controlling device, is set between the master cylinder 2a and the wheels RR and RL and is connected to the pump 40 and the reserver 41. The pump 40 is driven by the internal combustion engine 4, and the brake fluid in the reserver 41 is thereby pressurized to attain an increase of its pressure, the said fluid with the increased pressure being then fed as the power pressurized fluid to the actuator 30. The actuator 30 is provided with a pair of electromagnetic switching valves not shown in the Figure, and these electromagnetic switching valves have the solenoids 31 and 32 shown in FIG. 3 and are driven with the output signals from the electronic control device 10.

Thus, the system makes an adjustment of the brake fluid pressure to such a level as will not result in any locking of the wheels RR and RL by selecting a mode as appropriate out of the available modes, which are the "pressure increase" mode, in which the fluid pressure fed out of the pump 40 is supplied to the wheel cylinders 53 and 54 and the brake fluid pressure is thereby increased, the "pressure decrease" mode, in which the brake fluid pressure is reduced by fluid inter-transfer with the reserver 41, and the "pressure hold" mode, in which the brake fluid pressure is held as it is. Furthermore, the system has still another mode, i.e. the "direct connection" mode, in which the solenoids 31 and 32 are set in their non-excited state and the master cylinder 2a thereby establishes its direct connection with the wheel cylinders 53 and 54.

The proportioning valve 60, which is set between the actuator 30 and the wheel cylinders 53 and 54 mentioned above, has the function of approximating the brake fluid pressure fed to the wheel cylinders 53 and 54 at the side of the rear wheels to the ideal distribution of the braking force by reducing the pressure in a certain ratio to the input fluid pressure. The proportioning valve 60 used in this example of preferred embodiment is one of the so-called load sensing type, which changes its characteristics in accordance with the load borne with the wheels RR and RL.

On the differential gear 7, which is connected to the wheels RR and RL, is arranged a wheel velocity sensor 20, namely, a wheel velocity detecting means. The wheel velocity sensor 20 detects the rotating speed of the propeller shaft 6, namely, the average wheel velocity Vw of the rear wheels RR and RL, which are the driving wheels, and outputs electrical signals corresponding to the detected wheel velocity Vw to the electronic control device 10. Also, an acceleration sensor 21, which is an acceleration detecting means, is fixed in an appropriate position to which the vibrations from the road surface and the vibrations of the internal combustion engine 4 are hardly transmitted and detects the acceleration (including deceleration unless specifically excluded) of the motor vehicle, feeding the output of electrical signals to the electronic control device 10.

Also, in order to detect the operation of the brake pedal 3, a brake switch (brake operation detecting means) 22 is provided to perform its breaking and making operations in interlocking with the brake pedal 3. This brake switch 22 is turned ON when the brake pedal 3 is operated, the stop lamp not illustrated in the Figure being thereupon turned on, and also the electrical signal indicating that the brake pedal 3 is in its operated state is output to the electronic control device 10. Thus, the output electrical signals from the wheel velocity sensor 20, the acceleration sensor 21, and the brake switch 22 mentioned above are input into the electronic control device 10.

Figure 3:
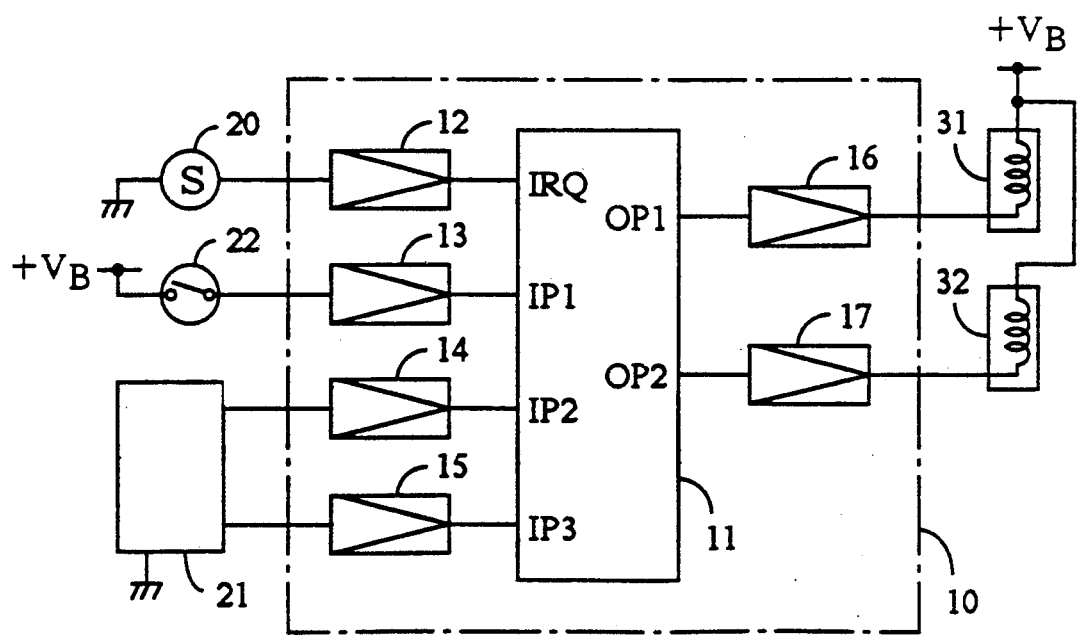
FIG. 3 is a block diagram illustrating the construction of the electronic control system shown in FIG. 2.

The electronic control device 10 is provided with a microprocessor 11, a waveform rectifying circuit 12, an input buffers 13, 14, and 15, and output buffers 16 and 17, as shown in FIG. 3. For the microprocessor 11 in this example of preferred embodiment is used a single-chip microcomputer generally offered for sale on the market, and this microcomputer has a free run timer, which outputs the current time, a ROM which stores the program, and a RAM, etc., which are necessary for the execution of the program.

To the waveform rectifying circuit 12, sine wave voltage signals are input from the wheel velocity sensor 20, and the signals are converted into square wave signals in this waveform rectifying circuit 12, the square wave signals being then fed to the interrupt requiring terminal IRQ of the microprocessor 11. Accordingly, interrupt demands are made of the microprocessor 11 at such intervals of time as are in keeping with the wheel velocity detected by the wheel velocity sensor 20.

Also, the on and off states of the brake switch 22 are input to the input port IP1 of the microprocessor 11 via the input buffer 13 in the form of a high level (H) signal for the time when the brake switch 22 is in its on-state and a low level (L) signal when the said brake switch is in its off-state. Moreover, the output from the acceleration sensor 21 is input to the input ports IP2 and IP3 of the microprocessor 11 by way of the input buffers 14 and 15. In this case, the output characteristics of the acceleration sensor 21 are set as shown in Table 1 given below, and the input signals fed to the input ports IP2 and IP3 are set at the high (H) level or the low (L) level in accordance with the acceleration of the motor vehicle. In this regard, the mark G in the table indicates the acceleration of gravity.

TABLE 1

| Acceleration Input Port | −0.4 G or less | −0.4 G to −0.2 | −0.2 G to 0.2 | 0.2 G to 0.4 G | 0.4 G or more |
|---|---|---|---|---|---|
| IP 2 | H | L | L | L | H |
| IP 3 | H | H | L | H | H |

In the meanwhile, the output port OP1 of the microprocessor is connected to the solenoid 31 on one of the electromagnetic switching valves in the actuator 30 by way of the output buffer 16. The output port OP2 is connected to the solenoid 32 on the other electromagnetic switching valve by way of the output buffer 17. These output buffers 16 and 17 form the circuits which respectively amplify the electrical signals output from the output ports OP1 and OP2 and respectively excite the solenoids 31 and 32 of the actuator 30.

Thus, in the electronic control device 10 mentioned above, a series of processes for the anti-skid control are performed in accordance with the program executed by the microprocessor 11, and electrical signals are output from the output ports OP1 and OP2. This program has a main routine shown in the flow chart in FIG. 4 and an interrupt routine shown in the flow chart in FIG. 5 and executed when electrical signals are input to the interrupt requiring terminal IRQ.

Figure 4:
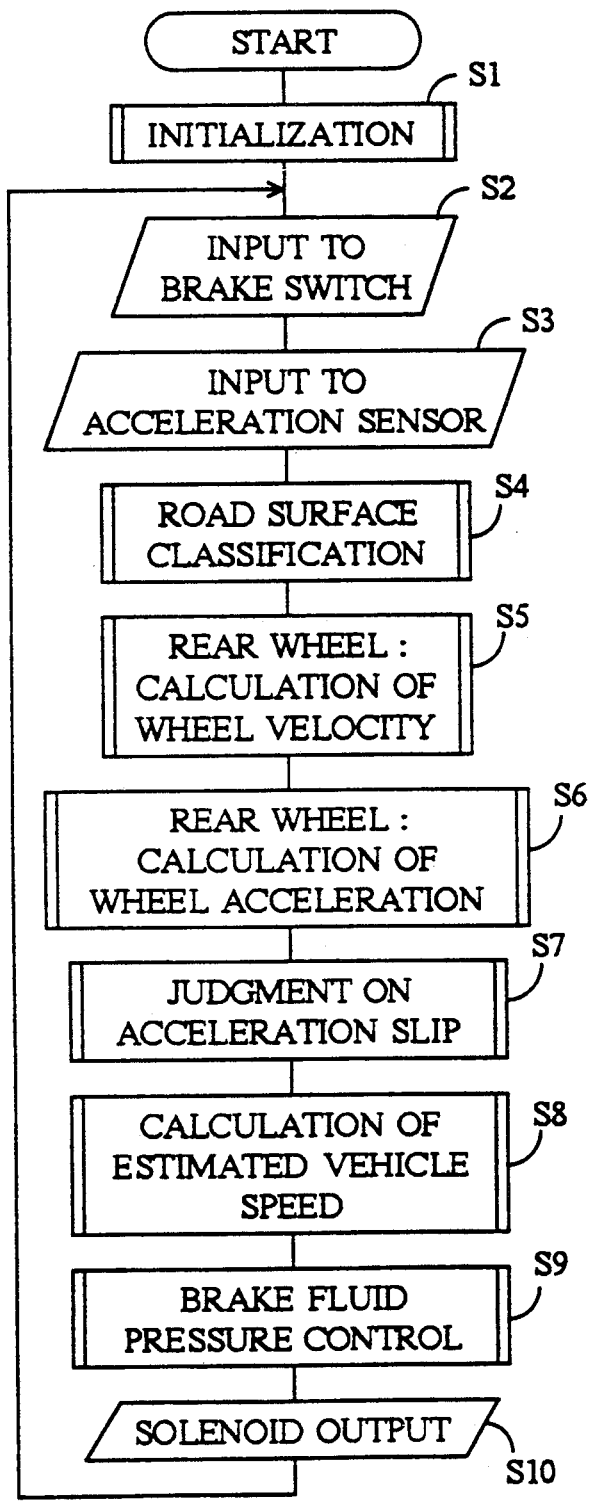
FIG. 4 is a flow chart showing the processing of the main routine for the control of braking force in one preferred embodiment of the present invention.

First, a description is made of the main routine shown in FIG. 4. When power is supplied to the electronic control device 10, the process of initialization is performed at the step S1. That is to say, the ta, tb, and "control-in-process" flag is cleared to zero. Also, the output from the output ports OP1 and OP2 are set in such a way that the solenoids 31 and 32 are put into their non-excited state.

Next, at the step S2, the signals indicating the state of the brake switch 22 are input into the microprocessor 11. Also, as the operation of the system proceeds to the step S3, the signals shown in Table 1 given above are input via the input buffers 14 and 15 in accordance with the acceleration of the motor vehicle as detected by the acceleration sensor 21. Then, at the step S4, the road surface is judged on the basis of the input signals from the acceleration sensor 21. That is to say, it is judged, when the absolute value of the detected acceleration is large, that the vehicle is running on a road surface with a high coefficient of friction (the coefficient of friction is hereinafter expressed with $\mu$), and the road surface is therefore classified as a high-$\mu$ road surface, and, in the same manner, the road surfaces with lower coefficients of friction are classified as medium-$\mu$ road surfaces and low-$\mu$ road surfaces, as shown in Table 2 given below.

TABLE 2

| IP 2 | L | L | H |
|---|---|---|---|
| IP 3 | L | H | H |
| Road Surface Classification | Low-$\mu$ | Medium-$\mu$ | High-$\mu$ |

It is to be noted in this regard that the classification given above is the one for performing the subsequent processes in accordance with the magnitude of the acceleration actually at work on the vehicle body, and it is therefore not necessarily bound by the usual meaning of the expression, "road surface classification".

Next, proceeding to the step S5, the system finds the average wheel velocity Vw by arithmetic operations with the equation (1) cited below on the basis of the period ΔTw of the output electrical signal from the wheel velocity sensor 20. In this regard, the period ΔTw is measured by the interrupt routine to be described later.

$$Vw = K/\Delta Tw \quad (1)$$

Wherein, K is a constant set on the basis of the characteristics of the wheel velocity sensor 20.

At the step S6, the wheel acceleration Gw of the rear wheels is found, by arithmetic operations with the equations (2) and (3) cited below, from the wheel velocity Vw as determined by arithmetic operations at the step S5.

$$Int = (\Delta Tw_{(n)} + \Delta Tw_{(N-1)})/2 \quad (2)$$

$$Gw_{(n)} = (Vw_{(n)} - Vw_{(n-1)})/Int \quad (3)$$

Wherein, the mark Int indicates the time for the interrupt interval, and $Vw_{(n)}$ and $\Delta Tw_{(n)}$ respectively represent the wheel velocity Vw and the period ΔTw, which have been obtained by the arithmetic operations just described, and $Vw_{(n-1)}$ and $\Delta Tw_{(n-1)}$ respectively represent the wheel velocity Vw and the period ΔTw, which were obtained earlier.

Then, proceeding to the step S7, the system performs the judgment of acceleration slips. In specific terms, the system judges whether or not any state of acceleration slip has occurred with the wheel velocity Vw of the wheels RR and RL, which are the driving wheels, has exceeded the estimated vehicle speed $Vs_0$, which is described later, while the brake switch is in its OFF-state. The details of this operation at the step S7 will be described later with reference to the subroutine given in FIG. 7.

Next, at the step S8, the system find the estimated vehicle speed $Vs_0$ on the basis of the state of the brake switch as read into the system at the step S2, the result of the road surface classification at the step S4, the result of the judgement passed on the acceleration slip at the step S7, and the wheel velocity Vw found by arithmetic operations at the step S5. Moreover, the details of the process at the step S8 will be described later with reference to the subroutine given in FIG. 8.

Then, the system proceeds to the operation at the step S9, at which the system judges how to control the pressure of the brake fluid in the wheel cylinders 53 and 54 on the basis of the wheel velocity Vw, the wheel acceleration Gw, and the estimated vehicle speed $Vs_0$, which are obtained at the steps S5, S6, and S7, respectively. Moreover, a description will be made later also of the process to be performed at the step S9. Then, the system proceeds to the operation at the step S10, at which the output signals for driving the solenoids 31 and 32 in accordance with the result of the judgment at the step S9 are output from the output ports OP1 and OP2, and the brake fluid pressure applied to the wheel cylinders 53 and 54 is thereby increased, decreased, or maintained at the same level.

The processes at the steps S1 through S10 are performed repeatedly, and, in case there occurs a considerable slip of the wheels RR and RL on the road surface by the effect of a sharp decline in the wheel velocity Vw, the brake fluid pressure is reduced to promote the rotation of the wheels RR and RL, and the slip of the wheels RR and RL on the road surface is thereby restrained.

Figure 5:
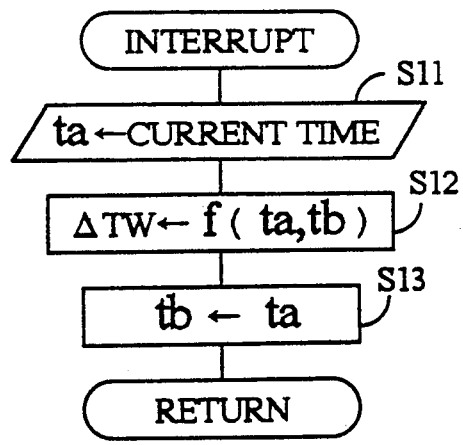
FIG. 5 is a flow chart showing the processing of the interrupt routine in the same preferred embodiment of the present invention.

FIG. 5 shows the interrupt routine mentioned above, and the interval of time between the previous interrupt demand and the current interrupt demand namely, the period ΔTw of the output electrical signal from the wheel velocity sensor 20, is measured. First, the current time ta is set up at the step S11 by the free run timer. Next, at the step S12, the difference of time between the time tb when the previous interrupt demand was made and the current time ta is found by arithmetic operations, and the period ΔTw of the output electrical signal from the wheel velocity sensor 20 is thereby set up. Then, the system proceeds to the step S13, and the time tb is set up in renewal in preparation for the next interrupt demand. After the processes at the step S11 through S13 are performed, the processing of the main routine is performed again.

Figure 6:
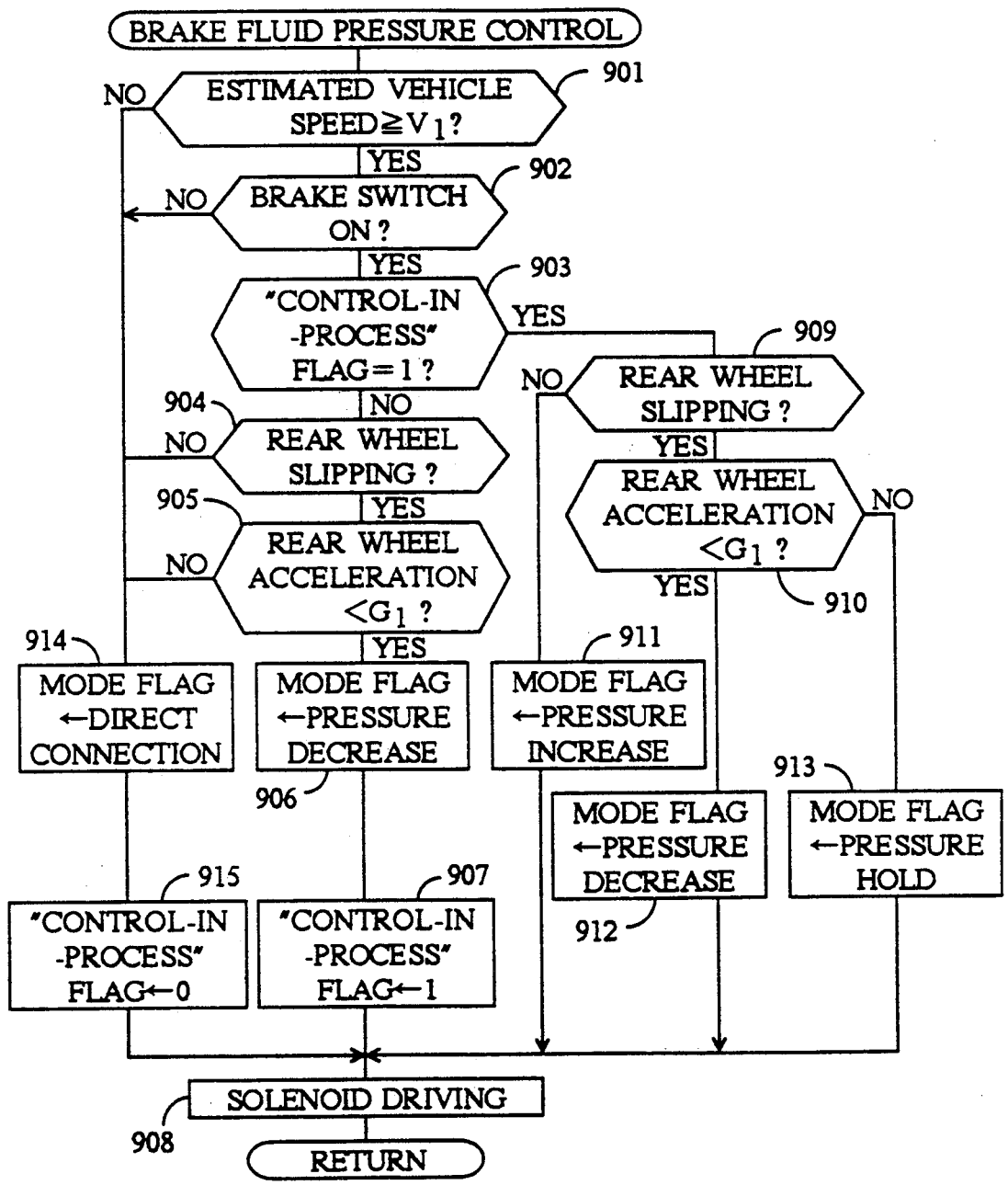
FIG. 6 is a flow chart showing the processing of the subroutine for the control of brake fluid pressure in the same preferred embodiment of the present invention.

Next, with reference to FIG. 6, a description is made of the subroutine for the control of the brake fluid pressure to be performed at the step S9 shown in FIG. 4. First, at the step 901, the estimated vehicle speed $Vs_0$ si compared with the prescribed stop marking speed $V_1$. This stop marking speed $V_1$ is the speed for use as the criterion for judging whether or not the vehicle is stopped, and it is set at approximately 5 km/h for this example of preferred embodiment. In case the estimated vehicle speed $Vs_0$ is either equal to or in excess of the stop marking speed $V_1$, the process at the step 802 is performed. In contrast to this, in case the estimated vehicle speed $Vs_0$ is less than the stop marking speed $V_1$, the system proceeds to the step 914, and the brake fluid pressure control is not performed.

At the step 902, it is judged whether or not the brake switch 22 is turned ON. When the brake switch 22 is turned ON, the system proceeds to the step 903. In case the brake switch 22 is turned OFF, the system proceeds to the step 914, and the brake fluid pressure control is not performed.

At the step 903, the system judges whether or not any "control-in-process" flag is set. This "control-in-process" flag is the flag which is set up at the step 907 described later when the brake fluid pressure control is started, and the flag is kept in the state of being set while the brake fluid pressure control is being performed. The system proceeds to the step 909 in case the "control-in-process" flag remains set, but proceeds to the step 904 in case the flag is not set.

At the step 904, it is judged whether or not the rear wheels RR and RL, which are the driving wheels, are slipping. Specifically, it is judged at the step 904 whether or not the wheel velocity Vw of the rear wheels is any lower than the estimated vehicle speed $Vs_0$ (i.e. $Vw < Vs_0$). In case it is found that the wheel velocity Vw is any lower than the estimated wheel speed $Vs_0$ (i.e. $Vw < Vs_0$), it is judged that a slip has occurred to the wheels RR and RL, and the system proceeds to the step 905. In contrast to this, in case the wheel velocity Vw is equal to or in excess of the estimated vehicle speed $Vs_0$ (i.e. $Vw \geq Vs_0$), it is judged that the wheels RR and RL are not slipping. In this case, the system proceeds to the step 914 and does not perform any brake fluid pressure control.

At the step 905, it is judged whether or not the wheel acceleration Gw of the rear wheels is any smaller than the prescribed acceleration $G_1$. In case the wheel acceleration Gw of the rear wheels is found to be any smaller than the prescribed acceleration $G_1$ (i.e. $Gw < G_1$), it is judged that the rear wheels RR and RL are just about to lock. In such a case, the step 906 is executed, and the brake fluid pressure control is started. In contrast to this, when the wheel acceleration Gw of the rear wheels is equal to or any larger than the prescribed acceleration (i.e. Gw≧G₁), it is judged that the rear wheels RR and RL will not lock immediately, and the system proceeds to the step 914 and does not performing any brake fluid pressure control.

If the step 906 mentioned above is performed, the electronic control device 11 starts the brake fluid pressure control. At the step 906, the mode flag is set in the pressure decrease mode, and, after the "control-in-process" flag is set at the step 907, the state of excitation and the state of non-excitation are set in the solenoids 31 and 32 in such a manner that the pressure of the brake fluid in the wheel cylinders 53 and 54 is reduced at the step 908. Moreover, the "control-in-process" flag is kept in its set state until the first estimated vehicle speed Vs₀ declines to a level lower than the stop marking speed V₁ (at the step 901) or until the brake switch 22 is turned OFF (at the step 902).

At the step 908, the state of excitation and the state of non-excitation are set in the solenoids 31 and 32, depending on the mode flag, which indicates either one of the "pressure decrease" mode, the "pressure increase" mode, the "pressure hold" mode, and the "direct connection" mode. Then, at the step S10 shown in FIG. 4, a driving signal is generated. When "pressure decrease" is indicated on the mode flag, the brake fluid pressure is reduced with an interconnection established between the wheel cylinders 53 and 54 and the reserver 41 by the action of the actuator 30. Moreover, when "pressure increase" is indicated on the mode flag, the fluid pressure output from the pump 40 is fed into the wheel cylinders 53 and 54 by the action of the actuator 30, and the brake fluid pressure in the said cylinders is thereby increased. Furthermore, when "pressure hold" is indicated on the mode flag, the brake fluid pressure in the wheel cylinders 53 and 54 is maintained by the action of the actuator 30. Additionally, when "direct connection" is indicated on the mode flag, the wheel cylinders 53 and 54 and the master cylinder 2a are directly connected by way of the actuator 30.

On the other hand, if it is found at the step 903 that the "control-in-process" flag is set, the system proceeds to the step 909, at which it is judged whether or not the rear wheels RR and RL, which are the driving wheels, are slipping. Now, since the process at this step 909 is the same as that at the step 904 mentioned above, a description of the process is omitted. In case it is judged that the wheels RR and RL are slipping, the system proceeds to the step 910. In case it is found that the wheels RR and RL are not slipping, the mode flag is set at "pressure increase" at the step 911, and, proceeding to the step 908, the system performs the pressure increase control of the brake fluid pressure in the wheel cylinders 53 and 54.

At the step 910, it is judged whether or not the wheel acceleration Gw of the rear wheels is any smaller than the prescribed acceleration G₁. In this regard, since the process at the step 910 is the same as that at the step 905, a description of the process is omitted here. In case the wheel acceleration Gw of the rear wheels is any smaller than the prescribed acceleration G₁, the mode flag is set at "pressure decrease" at the step 912, and the system proceeds to the step 908, at which it performs the control for a decrease of the brake fluid pressure in the wheel cylinders 53 and 54. In case the wheel acceleration Gw of the rear wheels is equal to or in excess of the prescribed acceleration G₁, the mode flag is set at "pressure hold" at the step 913, the system thereafter proceeding to the step 908, at which it performs the pressure maintaining control of the brake fluid pressure in the wheel cylinders 53 and 54.

By the repeated execution of the steps 909 through 913 mentioned above, the slip factor between the wheels RR and RL and the road surface is maintained at an approximately constant value, and stable braking force is thereby secured. Moreover, when the mode flag is set at "direct connection" at the step 914 upon the completion of the brake fluid pressure control, the "control-in-process" flag is reset at the step 915.

Figure 7:
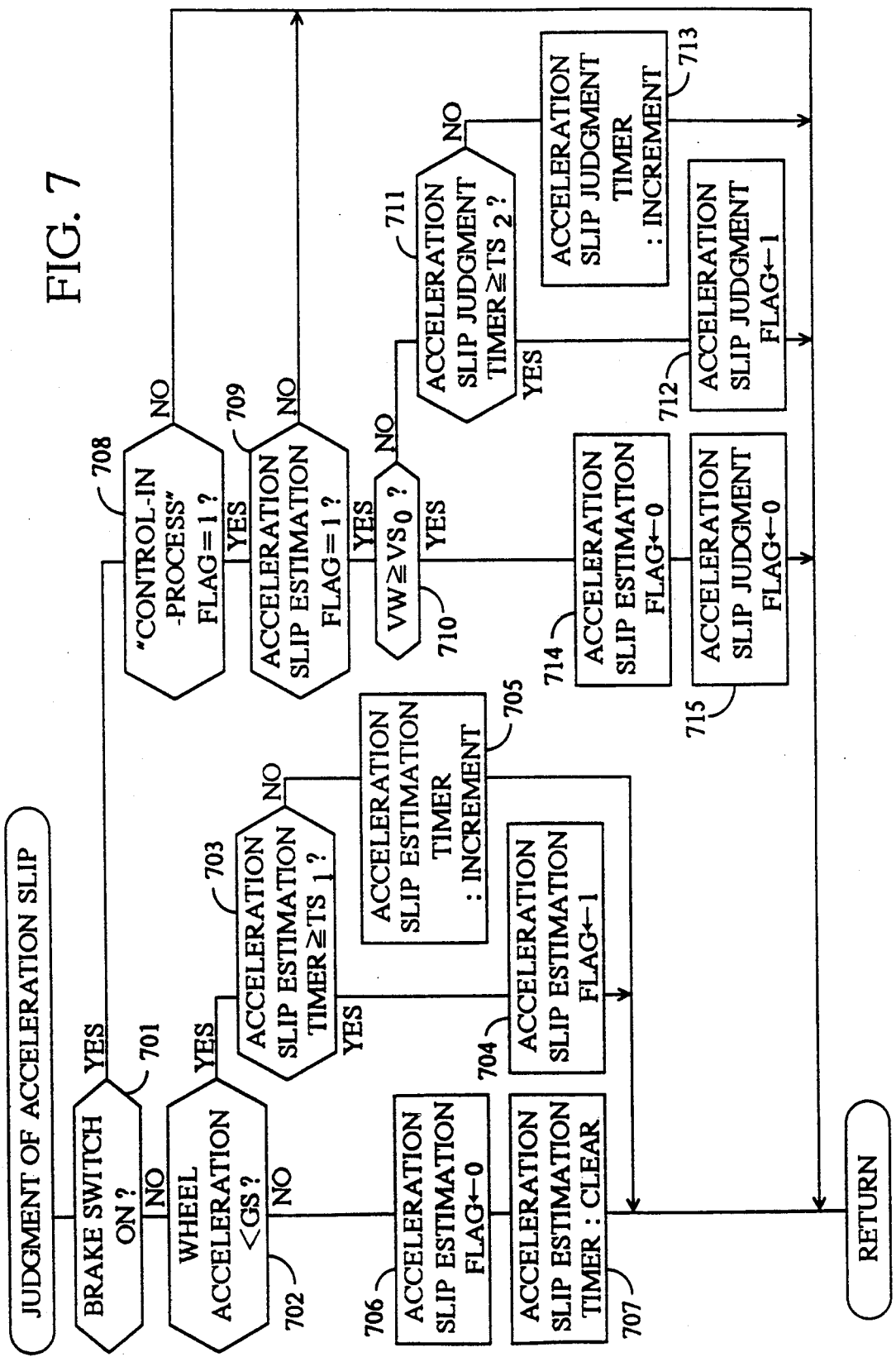
FIG. 7 is a flow chart showing the processing of the subroutine for finding an acceleration slip.
Figure 9:
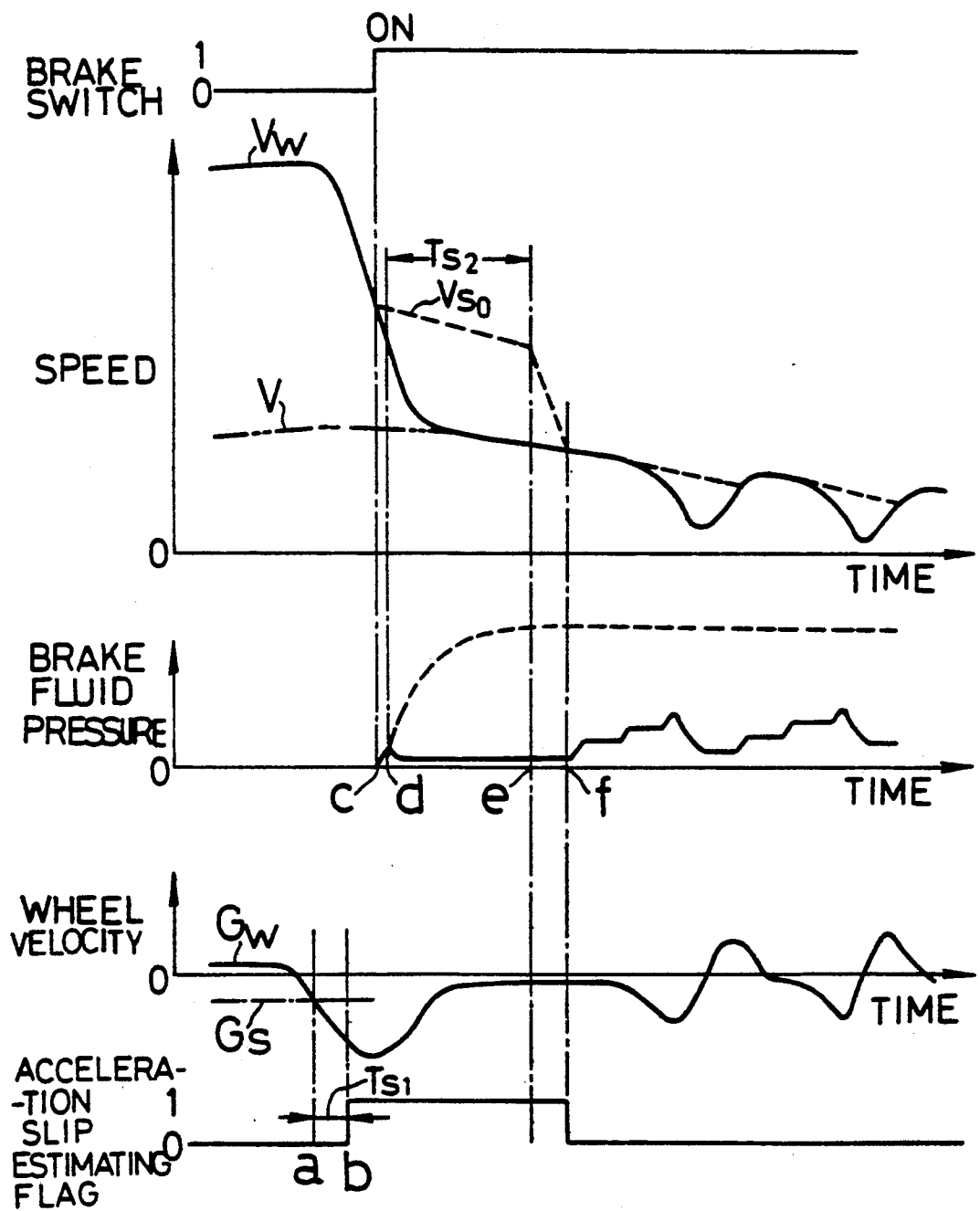
FIG. 9 is a graph illustrating the state of control to be performed by the anti-skid control system in the same preferred embodiment of the present invention at the time when an acceleration slip has occurred.

Next, FIG. 7 shows the subroutine for the step S7 shown in FIG. 4, and this subroutine performs the judgement of acceleration slips. Moreover, FIG. 9 shows one example of the state of operation performed at the time when braking is applied to a motor vehicle in this example of preferred embodiment. Specifically, (a) shows the states of the on and off operations of the brake switch 22, (b) shows the changes in the wheel velocity Vw, the estimated vehicle speed Vs₀, and the actual vehicle speed V, indicating the state in which the accelerating operation is cancelled after acceleration. Moreover, (c) shows the changes in the pressure of the brake fluid in the wheel cylinders 53 and 54, and (e) shows the set state of the acceleration slip estimating flag described later. In this regard, the broken line in (c) in FIG. 9 shows the output fluid pressure from the master cylinder 2a. In the following part, a description is made of the subroutine for the judgment of acceleration slips shown in FIG. 7, with reference to FIG. 9.

In FIG. 7, the on and off states of the brake switch 22 are first judged at the step 701. In the state before a brake operation is given to the motor vehicle, the brake switch 22 is in its OFF-state. Accordingly, the system proceeds to the step 702 and compares the wheel acceleration Gw with the prescribed acceleration Gs, which is −1.1 G, for example. In case the wheel acceleration is equal to or less than the Gs, the system performs the step 703 in order to find the state of an acceleration slip, including a case in which the accelerating operation is cancelled after an acceleration slip has occurred.

At the step 703, the system measures the duration of time in which a wheel acceleration equal to or less than the Gs continues, and, in case the measured time is equal to or longer than the first prescribed duration of time Ts₁, for example, 100 mS, then an acceleration slip estimating flag is set up at the step 704. That is to say, the "acceleration slip estimating flag" is the flag which is set up in case the wheel acceleration Gw not exceeding the prescribed acceleration Gs has continued for any period of time longer than the first prescribed duration of time Ts₁ while the brake switch remains in its OFF-state. With this flag, the system detects the decline in the wheel velocity Vw after the accelerating operation is cancelled upon the occurrence of a slip at the time of acceleration. For example, the wheel acceleration fell below the Gs at the point a in (e) and an acceleration slip estimating flag is set at the point b in (e) in FIG. 9. Moreover, if it is found at the step 703 that the wheel acceleration continues for any time less than the first prescribed duration of time Ts₁, it is judged that the wheel acceleration is a momentary fluctuation in acceleration, and the timer for measuring the continuing time is incremented at the step 705, upon which the operation of the system returns to the main routine.

On the other hand, in case the wheel acceleration Gw is either equal to or in excess of the prescribed acceleration Gs at the step 702, the system proceeds to the step 706, at which the system resets the acceleration slip estimating flag, and then the system clears the timer at the step 707, thereafter returning to the main routine.

In case the on-state of the brake switch 22 is found at the step 701 mentioned above, the system proceeds to the step 708, at which the system judges whether or not the "control-in-process" flag shown at the step 907 in FIG. 6 is set. If the "control-in-process" flag is not set, the system simply returns to the main routine, but, in case the said flag is set, that is, in case the control process has shifted to the anti-skid control as the result of a brake operation performed on the motor vehicle, the system performs the following control at the step 709. For example, as shown in FIG. 9, a braking operation is performed at the point C in (c), and the system shifts to the anti-skid control operation at the point d and starts a reduction of the brake fluid pressure.

Then, at the step 709, the system judges whether or not any acceleration slip estimating flag is set up, and, if the flag is not set up, the system returns to the main routine. In case the flag is set up, then the system judges at the step 710 whether or not the wheel velocity Vw has been restored to the level of the estimated vehicle speed Vso. In case the wheel velocity Vw is less than the estimated vehicle speed Vso, the system finds that no such recovery has yet been made of the wheel velocity Vw. Then, at the step 711, the system measures the duration of time in which this state continues, and, in case it is found that the said duration of time shows a continuation for or in excess of the second prescribed duration of time Ts2, for example, 300 mS, the system sets up an acceleration slip marking flag at the step 712.

The setup of this acceleration slip marking flag means that a braking operation was performed while the state of an acceleration slip was continuing for the first prescribed duration of time Ts1 and that the state in which the wheel velocity Vw is not restored up to the level of the estimated vehicle speed Vso has been continuing for or in excess of the second prescribed duration of time Ts2 even after the system shifted to the anti-skid control operation. For example, in FIG. 9, an acceleration slip marking flag is set at the point e, which shows the passage of the second prescribed duration of time Ts2 from the point d in (c), and the set state is maintained to the point f. In case such an acceleration slip marking flag is set, the system takes measures to avoid the state of the insufficiency of the braking force by reducing the estimated vehicle speed Vso to the level of the wheel velocity Vw in a short period of time, as described later. Moreover, if the system judges at the step 711 that the state of the acceleration slip continued for a duration of time less than the second prescribed duration of time Ts2, then the system increments the acceleration slip judging timer at the step 713.

On the other hand, in case it is judged at the step 710 that the wheel velocity Vw is equal to or in excess of the estimated vehicle speed Vso, it is found that the motor vehicle has got out of the state of insufficient braking force, with the restoration of the wheel velocity Vw. Then, the acceleration slip estimating flag is reset at the step 714, and also the acceleration slip marking flag is reset at the step 715, the system thereafter returning to the main routine. At this juncture, the system in this example of preferred embodiment is designed to judge the state of an acceleration slip by comparing the wheel acceleration Gw with the prescribed acceleration Gs at the step 702, but it is also feasible to set up a standard speed based on a prescribed acceleration (which is a deceleration in this instance) and to compare such a standard speed with the wheel velocity Vw.

Figure 8:
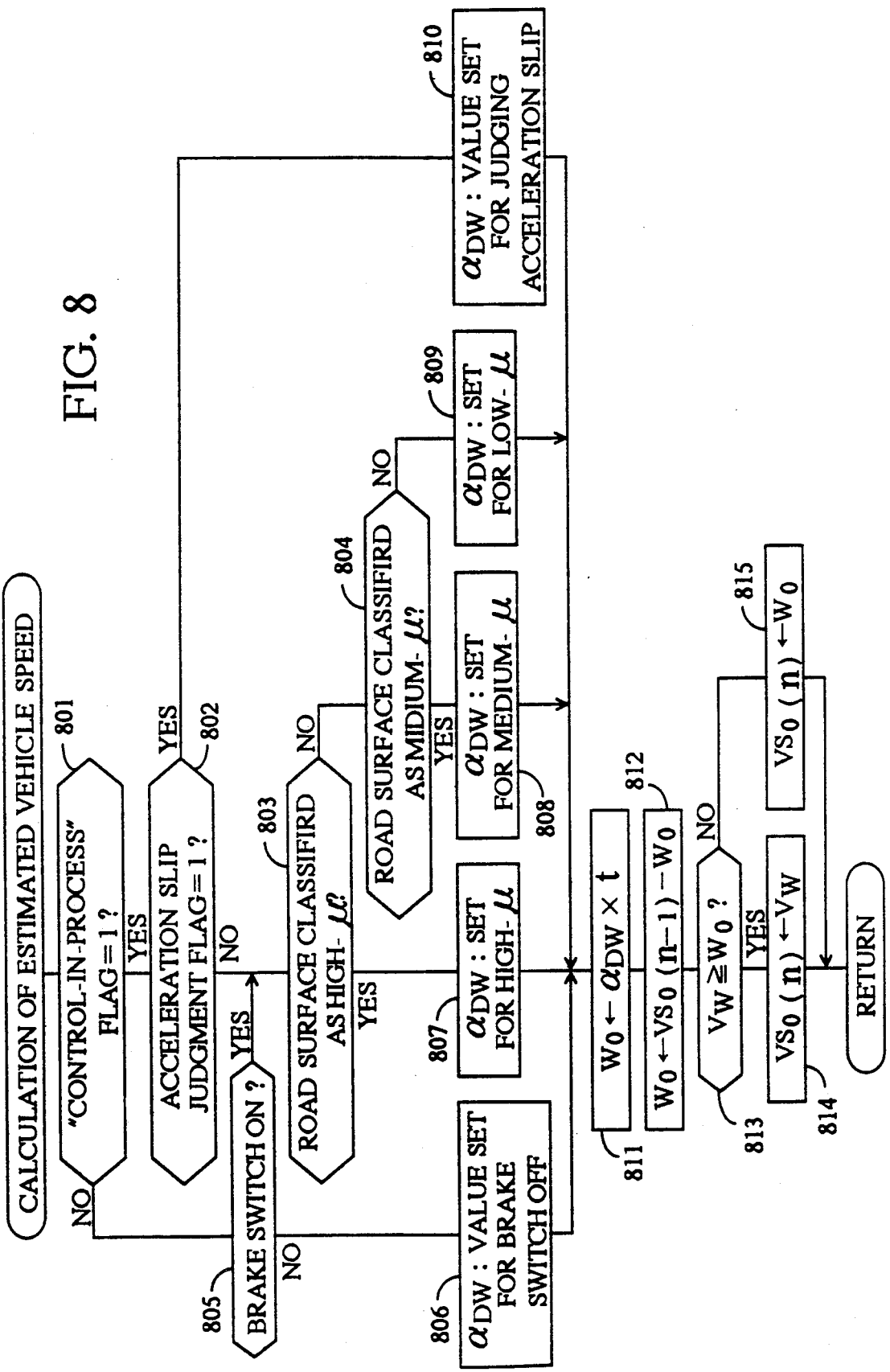
FIG. 8 is a flow chart showing the processing of the subroutine for the arithmetic operations for determining the estimated vehicle speed in the same preferred embodiment of the present invention.

FIG. 8 shows the subroutine for the step S8 in FIG. 4, and this subroutine performs the arithmetic operations to find the estimated vehicle speed $V_{S0}$. First, at step 801, the system judges whether or not the "control-in-process" flag shown at the step 907 in FIG. 6 described above is set. In case the flag is set, the system proceeds to the step 802, at which it judges whether or not the acceleration slip marking flag shown at the step 712 in FIG. 7 is set. If any acceleration slip marking flag is set, the system proceeds to the step 810 described later. If no acceleration slip marking flag is set, the system proceeds to the steps 803 and 804, at which it judges the result of the road surface classification at the step S4. Also, when the "control-in-process" flag is not set, the system judges the on/off state of the brake switch 22 at the step 805. If the state of the brake switch 22 is ON, the system proceeds to the steps 803 and 804, but, if the said state is found to be OFF, the system proceeds to the step 806.

The system then proceeds to the step 807 if the result of the road surface classification category is "high $\mu$", to the step 808 if the road surface classification category is "medium $\mu$", and to the step 809 if the said category is "low $\mu$", but proceeds to the step 810 if an acceleration slip marking flag is set. At these stops from the step 806 to 810, the value of the constant $a_{DW}$, which is to be used for finding the estimated vehicle speed $V_{S0}$ through arithmetic operations with the following equation (4), is set up on the basis of Table 3 shown below.

$$V_{S0(n)} = MAX(V_w, V_{S0(n-1)} - a_{DW} \cdot t) \quad (4)$$

Wherein, MAX (A, B) is the function for selecting the larger one of A and B, $V_{S0}$ expresses the estimated vehicle speed found at this time, $V_{S0(n-1)}$ represents the estimated vehicle speed recorded at the previous time, Vw represents the wheel velocity, and t indicates the period for the arithmetic operations.

TABLE 3

| Condition Road Surface Classification | Brake Switch ON | Brake Switch OFF | Acceleration Slip Criterion Flag: Set |
|---|---|---|---|
| Low $\mu$ | 0.4 G | 4.0 G | 2.0 G |
| Medium $\mu$ | 0.6 G | | |
| High $\mu$ | 1.1 G | | |

The steps 811 through 815 are those for performing the arithmetic operations with the equation (4) given above to find the estimated vehicle speed $V_{S0(n)}$ at this time, and the value of $a_{DW}$ x t is worked out at the step 811 and applied as the value of $W_0$. Next at the step 812, the estimated vehicle speed is set at the value obtained by deducting the value of $W_0$ from the estimated vehicle speed $V_{S0(n-1)}$ recorded at the previous time. Then, at the step 813, the wheel velocity Vw is compared with the value of $W_0$. If the wheel velocity Vw is less than the value of $W_0$, the value of the wheel velocity Vw is taken as the estimated vehicle speed $V_{S0}$ at the step 815, but, if the wheel velocity Vw is not any smaller than the value of $W_0$, then the estimated vehicle speed $V_{S0(n)}$ found at this time is set as the wheel velocity Vw at the step 814. Thus, at the time when an acceleration slip marking flag is set up, the value of $a_{DW}$ is set at a value larger than that of the $a_{DW}$ set at the time of the ordinary braking operation, and, accordingly, the estimated vehicle speed $V_{so(n)}$ to be found, namely, the speed to be taken as the standard for the anti-skid control, is set at the wheel velocity Vw, which deviates from the slip condition as found at the step 909 shown in FIG. 6, and the system sets the pressure increase mode at the step 911, securing the ordinary braking force. For example, it is seen with reference to FIG. 9, that the estimated vehicle speed $V_{so}$ declines sharply in the section between the point e and the point f in (b) and (c), thereby becoming equal to the wheel velocity Vw, whereupon the control for increasing the pressure of the brake fluid is started.

Figure 10:
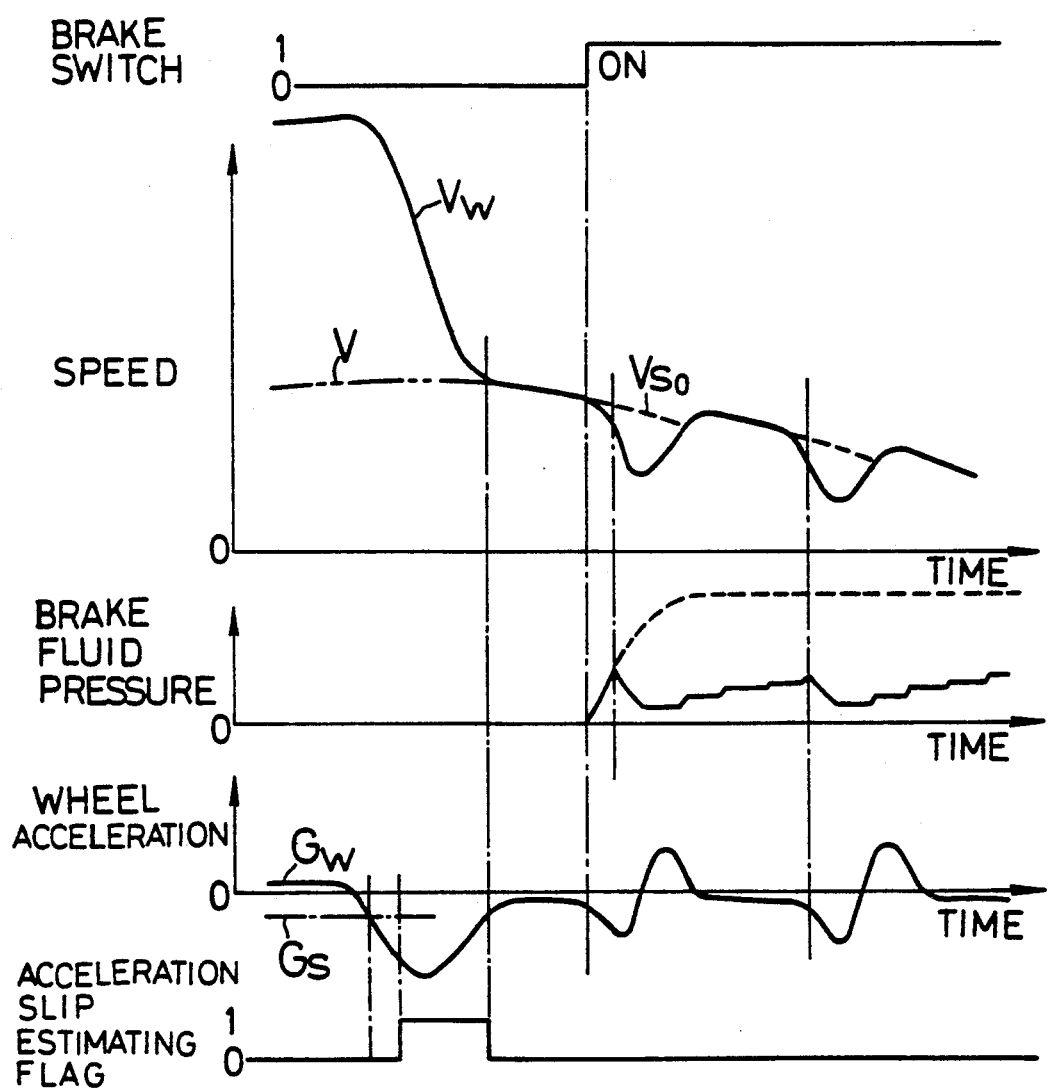
FIG. 10 is a graph showing the state of control performed by the anti-skid control system in the same preferred embodiment of the present invention after an acceleration slip is over.
Figure 11:
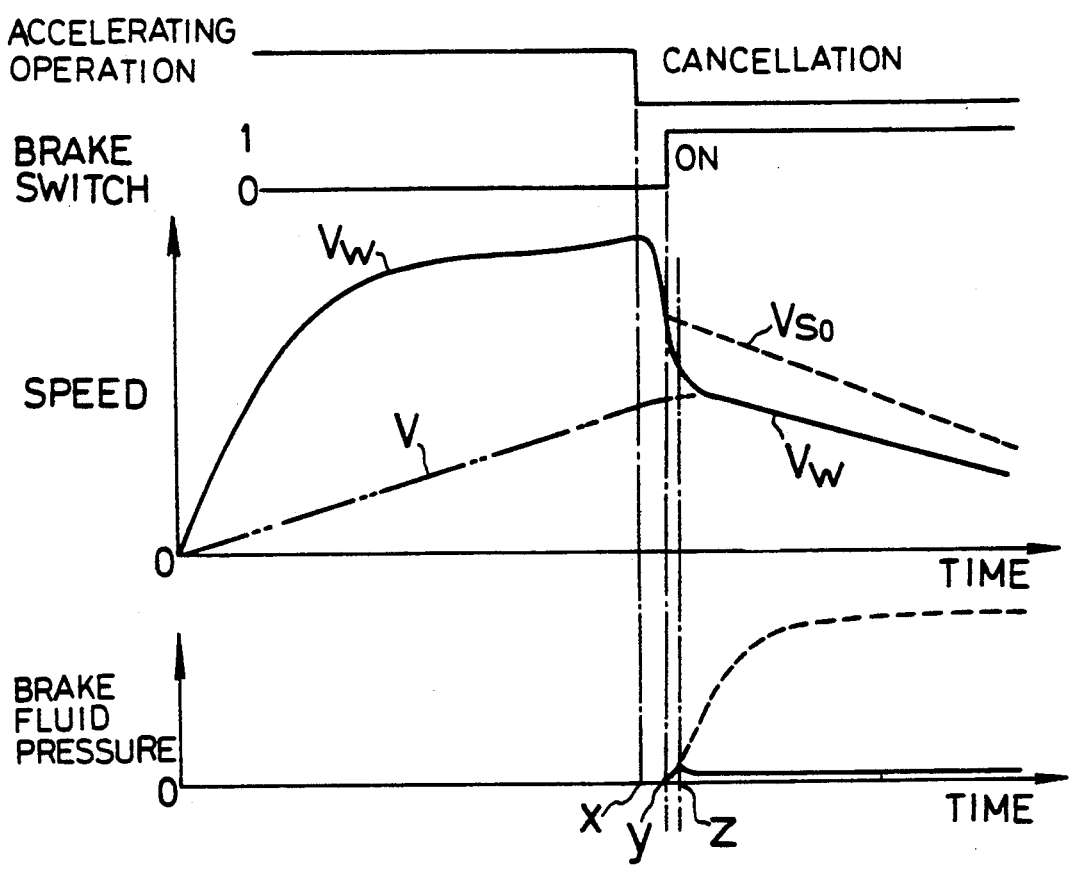
FIG. 11 is a graph showing the state of control by the existing anti-skid control system.

FIG. 10 shows the state of control performed after the extinction of the state of an acceleration slip. Here, (a) through (e) correspond to (a) through (e) in FIG. 9. Thus, in the state in which the acceleration slip estimating flag is not set up, as illustrated on the right hand side of (e) in FIG. 10, the ordinary anti-skid control is performed as shown in (b) and (c) is performed after the brake switch is turned ON in (a).

Advantageous Effect of the Invention

The present invention, which is constructed as described above, achieves the following advantageous effects.

Specifically, the anti-skid control system according to the present invention detects the state of slips at the time of acceleration by means of the acceleration slip detecting means, it is possible to ensure that the said system is prevented from making any erroneous operations due to acceleration slips at the time when it performs the anti-skid control. In addition, the system is capable of securing the prescribed braking force, with the braking force correcting means, in the course of the braking operation from the state of an acceleration slip.

What is claimed is:

1. An anti-skid control system for a vehicle which is provided with wheels including driving wheels, comprising:
    wheel velocity detectors each of which detects a wheel velocity of a corresponding driving wheel;
    estimated vehicle speed calculation means for calculating an estimated vehicle speed on the basis of the wheel velocity at the time, when the braking operation is started;
    acceleration slip estimating means for estimating an acceleration slip when a decline ratio of the wheel velocity is large and a braking operation is not established;
    acceleration slip judging means for judging occurrence of an acceleration slip when the estimated vehicle speed continues to exceed the wheel velocity for a period of time after establishment of the braking operation subsequent to the estimation of the acceleration slip; and braking force control means for controlling a braking force for each of the wheels while the braking operation is being established in such a manner that the braking force is set to be controlled in accordance with the magnitude of the braking operation, is set to be decreased when the wheel velocity is less than the estimated vehicle speed, and is set to be increased when the vehicle speed is being decreased after the judgment of the occurrence of an acceleration slip.

2. An anti-skid control system for a vehicle which is provided with wheels including driving wheels, comprising:
    wheel velocity detectors each of which detects a wheel velocity of a corresponding driving wheel;
    braking operation detecting means for detecting a braking operation on the basis of the wheel velocity at the time when the braking operation is started;
    estimated vehicle speed calculation means for calculating an estimated vehicle speed;
    braking force control means for controlling the braking force of each of the wheels while the braking operation detecting means detects a braking operation in such a manner that the braking force is set to be controlled in accordance with the magnitude of the braking operation and is set to be decreased when the wheel velocity is less than the estimated vehicle speed for the prevention of the slip of each of the wheels;
    acceleration slip estimating means for estimating an acceleration slip when a decline ratio of the wheel velocity continues to exceed a value for a first period of time while the braking operation detection means fails to detect a braking operation;
    acceleration slip judging means for judging the occurrence of an acceleration slip when the estimated vehicle speed continues to exceed the wheel velocity for a second period of time after the detection of a braking operation by the braking operation detecting means upon estimation of the acceleration slip; and
    estimated vehicle speed revising means for decreasing the estimated vehicle speed when an acceleration slip is judged to have occurred by the acceleration slip judging means.

3. A method for controlling an anti-skid control system of a vehicle which is provided with wheels including driving wheels, the method comprising the steps of:
    estimating an acceleration slip when a decline ratio of a wheel velocity is large and a braking operation is not established;
    controlling the braking force in accordance with the magnitude of a braking operation when the braking operation is executed;
    calculating an estimated vehicle speed on the basis of the wheel velocity at the time when the braking operation is started;
    decreasing the braking force when the wheel velocity is less than the estimated vehicle speed;
    judging whether acceleration slip has occurred when the acceleration slip is estimated and when the estimated vehicle speed continues to exceed the wheel velocity after the braking operation; and
    increasing the braking force when an acceleration slip is judged to have occurred.

* * * * *